United States Patent [19]

Kilmer et al.

[11] Patent Number: 4,739,427
[45] Date of Patent: Apr. 19, 1988

[54] HIGH CAPACITY HARD DISK CONSTRUCTION

[75] Inventors: Dan L. Kilmer, Reseda; Kenneth H. Brown, Simi Valley; Scott Henry, Canoga Park, all of Calif.

[73] Assignee: Micropolis Corporation, Chatsworth, Calif.

[21] Appl. No.: 3,063

[22] Filed: Jan. 14, 1987

[51] Int. Cl.[4] .......................................... G11B 5/012
[52] U.S. Cl. ...................................... 360/97; 360/98
[58] Field of Search .................................. 360/97–99, 360/106

[56] References Cited

U.S. PATENT DOCUMENTS 4,607,182  8/1986  Ballhaus .......................... 360/97 X Primary Examiner—A. J. Heinz
Attorney, Agent, or Firm—Poms, Smith, Lande & Rose

[57] ABSTRACT

A digital storage system of the Winchester or hard disk drive type has the annular, hard aluminum disks mounted coaxially around the drive motor. A central fixed aluminum shaft has the motor stator coils centrally mounted on it, and an aluminum disk mounting sleeve is mounted to the shaft by bearings located above and below the motor stator. To accommodate the difference in thermal coefficients of expansion between the steel cylinder forming the outer periphery of the motor's rotor and the aluminum disk assembly, the outer steel cylinder of the motor rotor is bonded to the aluminum disk sleeve by means of an elastic adhesive, which permits relative expansion between the steel and aluminum parts occasioned by changes in temperature of the drive. The rotor, including its permanent magnets and outer steel cylinder, is mounted from the inner surface of the aluminum disk mounting sleeve, with the rotor in operating proximity to the stator. The aluminum storage disks and the spacers between them are clamped between the top and bottom of the aluminum mounting sleeve.

14 Claims, 2 Drawing Sheets

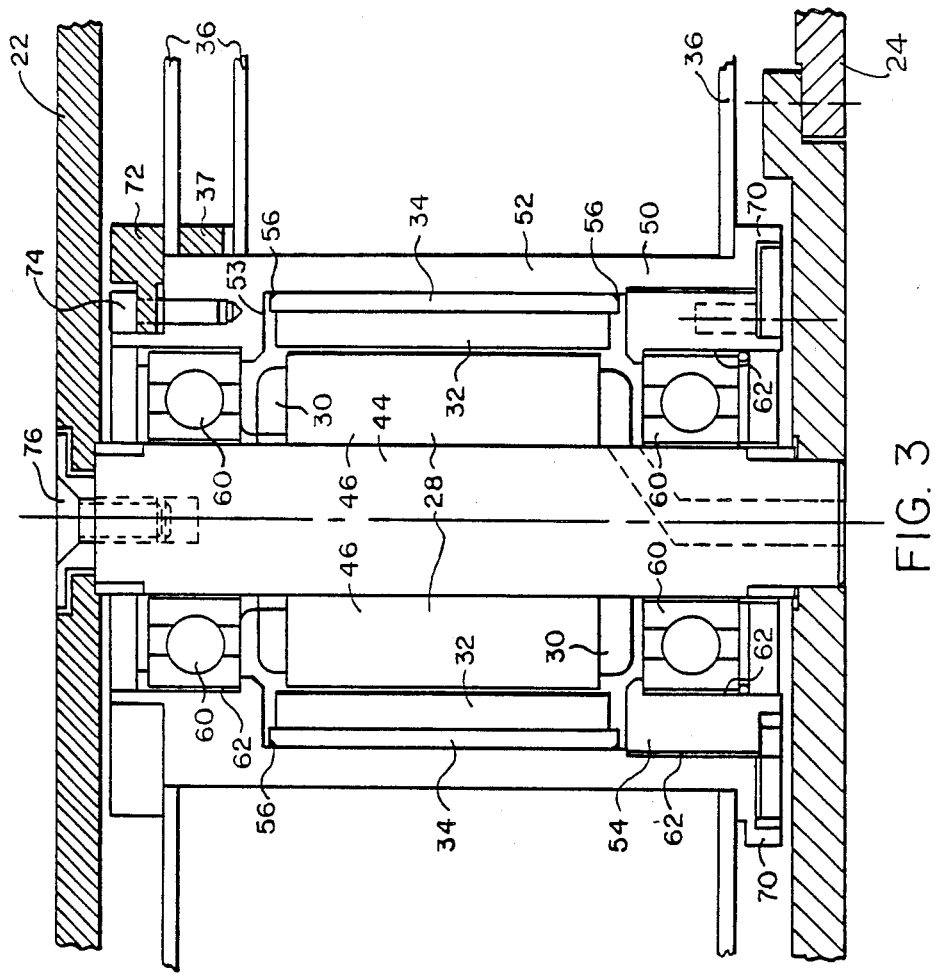
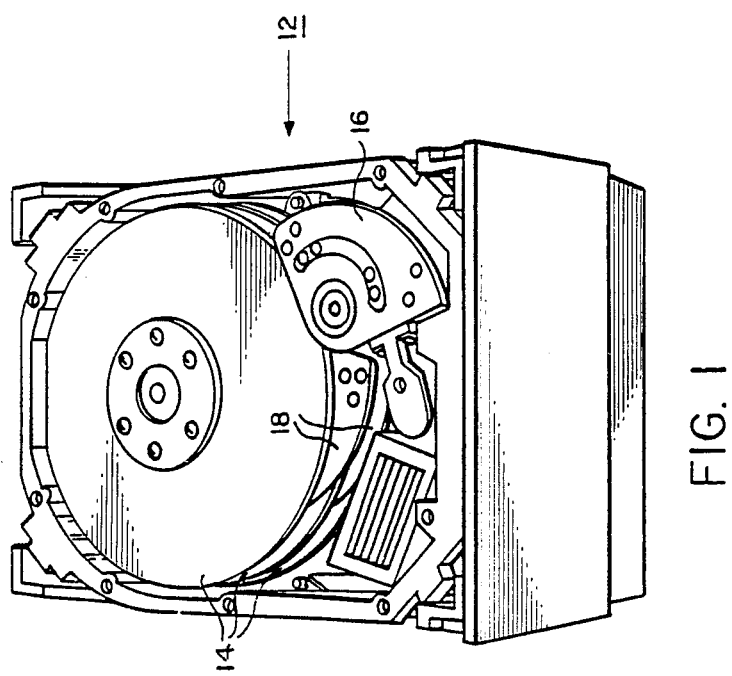

HIGH CAPACITY HARD DISK CONSTRUCTION

BACKGROUND OF THE INVENTION

1. Field of the Invention

This invention relates, in general, to digital information storage systems, and in particular, to high capacity hard disk drives.

2. Description of Related Art

Digital data may be stored on flexible or "floppy" disks or on hard or Winchester-type disks by the magnetization of successive small areas on the magnetic surface of the disk, by means of a magnetic head or "slider", as the disk rotates. The density of digital storage on hard disk memory systems is on the order of 10 to 20 times the density achieved with floppy disk memory systems.

In the field of hard disk systems, sometimes referred to as Winchester-type disk systems, the rigid disks are normally formed of an aluminum alloy, and have a magnetizable coating on their upper and lower surfaces.

Rigid magnetic storage disks were originally relatively large in diameter, but in the last few years, the size has been reduced so that 5¼ inch disk systems are now widely available. Further, industry standard dimensions have been established for 5¼ inch Winchester-type disk units, and these dimensions include a height of 3.25 inches (82.6 millimeters), a width of 5.75 inches (146 millimeters), and a depth of 8.00 inches (203 millimeters). Environmental standards have also been established, with the operating temperature extending from 10° C. to 50° C. and the non-operating or storage temperature extending from −40° C. to +65° C.

By using a flat type of drive motor, it has previously been possible to mount five hard disks of the 5¼ inch size within the industry standard dimensions mentioned hereinabove. This type of configuration would provide a storage capacity on the order of 170 megabytes.

However, increasingly sophisticated computer programs, coupled with increasingly complex processors have created an accelerating demand for additional rapid access storage, and accordingly, there is a demand for 5¼ inch disk drives with larger capacities. One way of increasing the number of disks which may be included within the industry standard dimensions is to locate the drive motor centrally with respect to the storage disks, with the disks being directly secured to the motor rotor. However, the rotor involves magnetic material, usually steel, and the storage disks are normally made of aluminum which is then coated on both sides with a magnetizable material. Unfortunately, the thermal coeffiecient of expansion of iron or steel is on the order of 6 to 9 microinches per inch per degree Fahrenheit, whereas the thermal coefficient of expansion of aluminum is on the order of 11–13 microinches per inch per degree Fahrenheit. Thus, if the aluminum disks were to be rigidly mounted to an outer steel cylinder forming part of the motor rotor or bearing periphery, the difference in thermal expansion over the range of temperatures through which the disk drive is to be operative, would cause the disks to flex or deform, so that the precision digital memory would not operate reliably. In this regard, it is to be noted that one of the disk surfaces is normally reserved for servo-control, so that normal and uniform expansion and contraction of the aluminum disks, without deformation or buckling, causes no problem. However, if the disks flex, or depart from their normal flat surface configuration, reliability will suffer severely, or the units may become wholly inoperative for digital storage.

A method of construction of a hard disk assembly which overcomes the thermal coexpansion problem by utilizing a thermal shrink fit engagement between the cylindrical steel member and the aluminum hard disk mounting assembly is described in my co-pending application entitled, "High Capacity Winchester Disk Drive", Ser. No. 911,637, filed on Sept. 25, 1986, now U.S. Pat. No. 4,717,977, and assigned to the same assignee as the instant invention.

Accordingly, a principal object of the present invention is to provide an alternative method for overcoming the problems of differential thermal expansion when aluminum memory disks are employed with a central motor having a steel frame or outer cylindrical portion of the rotor, as outlined hereinabove.

SUMMARY OF THE INVENTION

This object is preferably accomplished by the provision of a high capacity Winchester or hard disk drive which includes a central motor, including an outer, cylindrical steel member forming part of the motor's rotor, and an aluminum disk mounting sleeve having a length which is substantially coextensive with, or may extend beyond, the cylindrical steel member forming a part of the rotor, the steel member having an outer diameter sized less the aluminum sleeve in an amount to prevent interference between the member and the sleeve during thermal expansion or contraction over the range of temperatures anticipated and with the aluminum mounting sleeve being secured to the cylindrical steel member by means of an adhesive which is resiliently-elastic over the anticipated temperature range attaching between the inner and outer peripheries of the aluminum sleeve and steel member, respectively. In addition, a series of aluminum storage disks having magnetic coatings on their surfaces are mounted between the upper and lower ends of the aluminum mounting sleeve, with the storage disks being aligned with, and spaced from, one another about the aluminum mounting sleeve.

As a further aspect of the invention, the unit may be provided with a central fixed aluminum shaft on which the coils of the motor stator are mounted, with bearings supporting the aluminum disk mounting sleeve being located above and below the motor stator. The relatively lightweight permanent magnet rotor with its outer steel sleeve, is supported by the resilient adhesive from the inner surface of the disk mounting sleeve, with the rotor in operating proximity to the inner stator. The resilient adhesive is preferably applied in two circular bands around the two outer ends of the rotor, but could also be applied continuously along the length of the rotor.

As a preferred method of securing the aluminum storage disks to the aluminum mounting sleeve, the aluminum mounting sleeve is provided with a flange at one end, and a circular clamping member is provided at the other end of the aluminum mounting sleeve, with the circular clamping member being fastened with cap screws into the end of the aluminum sleeve to apply a force to the storage disks and intermediate spacing members at their inner edges to clamp them down onto the flange at the other end of the aluminum mounting sleeve.

Other objects and advantages of the invention will become apparent from a consideration of the following

BRIEF DESCRIPTION OF THE DRAWINGS

FIG. 1 is a top front perspective view of a Winchester or hard disk drive with the upper cover removed;

FIG. 3 is a detailed cross-sectional view of the central hub of the drive of FIG. 2.

DESCRIPTION OF THE PREFERRED EMBODIMENT

Figure 2:
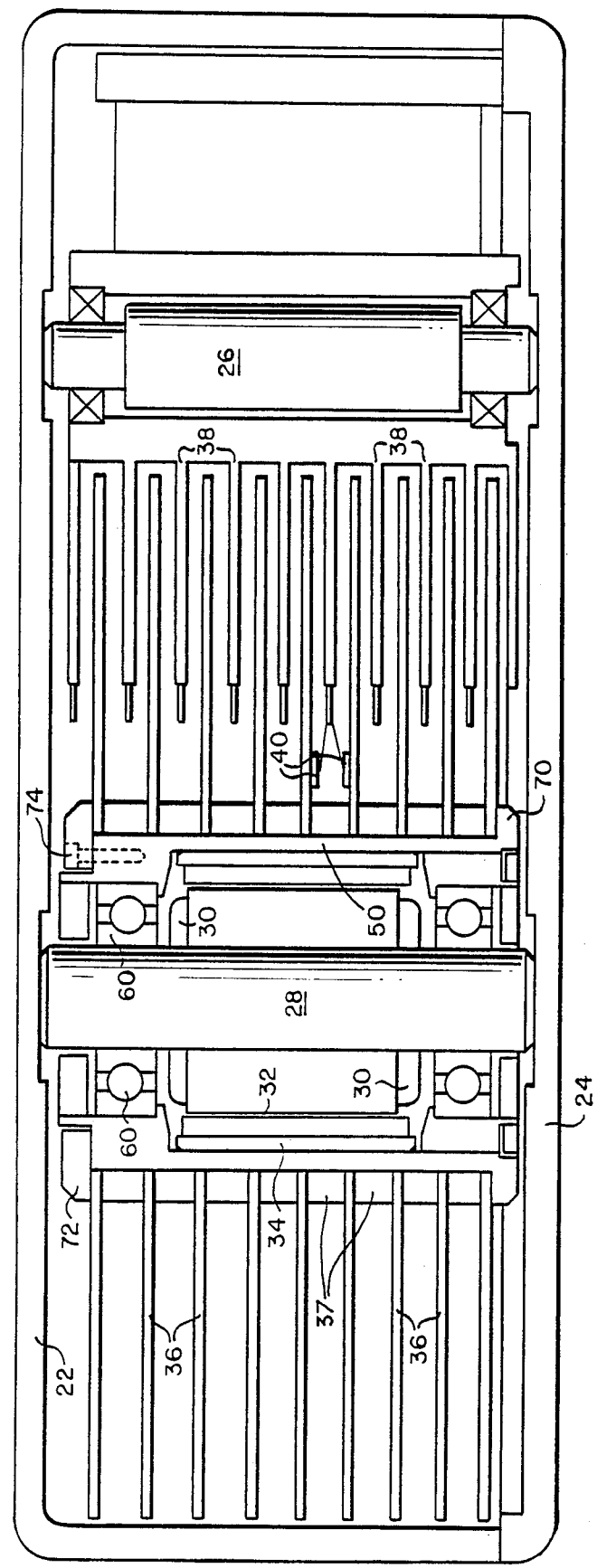
FIG. 2 is a cross-sectional view of a Winchester or hard disk drive illustrating the principals of the present invention.

Referring to the drawings, and more particularly, to FIG. 1, a disk drive unit 12 is illustrated, including a plurality of hard disks 14, and a head-positioning mechanism 16. Magnetic heads attached to the outer ends of the head-positioning arms 18 are moved substantially radially with respect to the center of the disks 14 under the control of the actuator 16, in order to shift all of the heads secured to the arms 18 together, across the magnetic surfaces of the disks 14.

In accordance with well-known practice in the field of Winchester or hard disk drives, each of the intermediate arms 18 is provided with two magnetic heads, one to interact with the lower surface of the upper disk and the second head to interact with the upper surface of the next-lower disk. One surface of the disk is normally reserved as a servo track disk surface, which is employed in controlling the positioning of the heads and the reading and writing, which is accomplished by the remaining heads. Of course, all of this is well-known in the field of Winchester, or hard disk drives. The disk drive shown in FIG. 1 is of the type manufactured by the assignee of the present invention.

FIG. 2 is a cross-sectional view of a Winchester or hard disk drive illustrating the principals of the present invention. Shown in FIG. 2 is the housing 22 and the housing closure plate 24 which seals the unit. Within the housing is the head-positioning mechanism 26 of the type shown in FIG. 1 at reference numeral 16, and a central motor 28 including coils 30 forming part of the central stator structure, and the rotor structure, including permanent magnets 32 and an outer steel sleeve 34. Secured to the rotor 32 in a manner to be described hereinbelow is an aluminum mounting sleeve 50 and nine aluminum memory disks 36. Extending from the head-positioner 26 between the disks 36 are a series of magnetic head-supporting arms 38. Secured to each of the magnetic head-supporting arms 38 are a pair of magnetic heads, such as those shown at reference numeral 40, mounted on one of the arms 38. The upper and lowermost arms 38 would have only one magnetic head 40 to engage the exposed surface of the adjacent disk, whereas all the other mounting arms 38 would have two magnetic heads of the type shown at 40, to engage the two facing surfaces of the memory disks 36. Incidentally, all of the arms 38 normally move together, and as mentioned elsewhere herein, one of the disk surfaces and mating heads acts as a servo system to control the position of the arms 38 through the head-positioner 26.

The configuration of the inner portion of the disk drive assembly will now be considered in greater detail by reference to FIG. 3 of the drawings. The disk drive includes the central aluminum shaft 44 which is fixed to the housing 22 and cover 24 and the motor 28 includes a stator having steel poles 46 and windings 30 fixedly mounted on shaft 44. Motor 28 is a brushless DC motor having an enclosing four pole permanent magnet rotor which, as mentioned above, includes the permanent magnets 32, and the surrounding steel cylindrical member 34. The central stator may, for example, include 15 slots or 12 slots, with the steel structure being provided with windings which are energized under the control of Hall effect sensors, to control the energization of selected windings to rotate the rotor and the memory disks which are driven by the motor.

In the exemplary preferred embodiment illustrated in FIG. 2, aluminum mounting sleeve 50 comprises an elongated cylinder 52 which is substantially coextensive with the entire motor assembly 28 and which contains a coaxial counterbore extending from its lower end to a shoulder 53 at a height about equal to that of the upper coils 30 of the motor 28. A shorter, annular aluminum sleeve or ring 54 is retained within the lower end of the counterbore. The space between shoulder 53 and ring 54 defines a coaxial cylindrical region within aluminum mounting sleeve 50 having a cylindrical inner periphery to which the outer periphery of steel cylinder member 34 is attached to mount the lightweight permanent magnet rotor in operating proximity to the inner stator. This arrangement couples a rotational torque from motor 28 to the memory "drum", or assembly of mounting sleeve 50 and memory disks 36.

Considering the structure described hereinabove from a thermal expansion standpoint, with the thermal coefficient of expansion for aluminum being assumed to be about 12 microinches per inch per degree Fahrenheit, and that of iron or steel to be on the order of 8 microinches per inch per degree Fahrenheit, the difference would be about 4 microinches per inch per degree Fahrenheit. Assuming a temperature range of approximately 50° C., or approximately 112° F., the differential in thermal expansion would be approximately 448 microinches.

Since disk mounting sleeve 50 must be attached to steel cylinder member 34 in order that the disks 36 may be driven, some account must be taken of the differential in coefficients of thermal expansion between the two members in their method of attachment, or the possibility exists that aluminum mounting sleeve 50 may become detached or that steel cylinder member 34 may exert sufficiently large forces upon aluminum disk mounting sleeve 50 to cause warping and/or dimensional instability within the assembly of hard disks 36.

A method of construction of a hard disk assembly 12 which overcomes the thermal coexpansion problem by utilizing a thermal shrink fit engagement between the cylindrical steel member 34 and the aluminum hard disk mounting assembly is described in a co-pending application entitled, "High Capacity Winchester Disk Drive", Ser. No. 911,637, filed Sept. 25, 1986, now U.S. Pat. No. 4,717,977, and assigned to the same assignee as the instant invention.

An alternative method of attaching the aluminum disk mounting sleeve 50 and the cylindrical steel member 34 to one-another is illustrated in the exemplary preferred embodiment of FIG. 3. It has been learned that, if a sufficient clearance is provided between the two parts to allow for differential thermal expansion, a resilient adhesive material may be used to reliably bond the two parts together without either detachment or distortion over the operative temperature range.

Thus, in the exemplary preferred embodiment illustrated, aluminum disk mounting sleeve 50 and steel cylindrical member 34 are dimensioned to leave a 0.002–0.003″ radial clearance between each other at about room temperature (70° F.) such that, for a steel cylinder member 34 having an outer diameter of between 1⅜″ and 1½″, the entire assembly may experience a full temperature range of approximately 50° C. without steel cylinder member 34 ever contacting aluminum disk mounting sleeve assembly 50 with sufficient force to distort disk mounting sleeve 50.

In order to accomplish the bonding, steel cylinder member 34 is provided with a chamfered outer periphery at either end which defines a circular bonding region 56 between the chamfer and the inner diameter of aluminum disk-mounting sleeve 50, which bonding region 56 is filled at both ends of steel cylinder member 34 with a suitable flexible bonding means. In the preferred method of construction, the mounting means comprises a pair of beads within circular bonding region 56 of a flexible, silicone adhesive which is self-curing in air at room temperature and which may be fast-cured by exposure to ultraviolet light. Several brands of adhesive have been found to be satisfactory, and typically comprise a one-component, acetoxy-cured polysiloxane which cures to a flexible silicon rubber which remains elastomeric over a wide temperature range. Specific brands which have been used successfully include Loctite ® Superflex TM 596, Loctite ® Tempflex TM, Loctite ® Hyflex TM FMD-88 and Dow Corning ® Silastic ® Brand 732 RTV, some of which meet the military specification MIL-A-46106A, Type 1. However, any other adhesive material possessing both sufficient elasticity and strength to support the lightweight permanent magnet rotor and to withstand a maximum turning torque of about 12 inch-ounces over the anticipated temperature range may be utilized, provided the material does not exude or outgas undesirable contaminates within the sealed unit over time.

In this connection, it is to be noted that assembly of hard disk unit 12 is normally accomplished in a clean room after all parts have been cleaned and degreased. Accordingly, no special preparation procedures are necessary to accomplish bonding, other than to assure that the adhesive is completely cured before applying any substantial torque between steel cylinder member 34 and aluminum disk mounting sleeve 50.

Aluminum disk-mounting sleeve 50 is mounted for rotation about motor 28 by means of a pair of ballbearing assemblies 60 located at either end of the central aluminum shaft 44. Typically, bearing assemblies 60 are fabricated from a steel alloy. Hence, a dissimilar thermal expansion problem similar to that between mounting sleeve 50 and steel member 34 is suggested between steel bearing assemblies 60 and aluminum shaft 44 or aluminum mounting sleeve 50 or aluminum ring 54. However, for shock and vibration reasons, it is undesirable to attach shaft 44 or mounting sleeve 50 to bearing assemblies 60 by means of the flexible adhesive described hereinabove, since the stresses applied to the adhesive may be significantly higher than the relatively low stresses applied to the adhesive means by the torque of motor 28 and the relative low weight of the motor rotor supported by the adhesive bands. It is further noted that the bearing assemblies 60 are not monolithic, as in the case of steel member 34, and are mounted between the fixed central aluminum shaft 44 and the aluminum disk assembly. These favorable factors, coupled with the fact that a certain of amount of pre-loading is acceptable within bearing assemblies 60, permits the assembly of shaft 44 and mounting sleeve 50 to bearing assembly 60 by means of a less-elastic, but stronger, adhesive material. In the exemplary preferred embodiment, both shaft 44 and elongated cylinder 52 and annular aluminum sleeve 54 of aluminum mounting sleeve 50 are bonded to their corresponding bearing assemblies 60 by means of a capillarity-wicking adhesive with the brand name Loktite ® 609 or Loktite ® "Assure", injected in the annular regions 62 between the three respective members during assembly.

The aluminum hard disks 36, together with their associated spacers 37 (see FIG. 2), are mounted to aluminum disk-mounting sleeve 50 by clamping them between the lower flange 70 and the clamping member 72 which, in turn, is secured to the upper edge of the aluminum sleeve 50 by a set of six cap screws 74 which may be evenly spaced around the enlarged end of the aluminum sleeve 50. In practice, the disks and the spacers are held in concentric positions with respect to the inner assembly from their outer edges, while the cap screws 74 are tightened to bring the clamping member 72 into firm engagement with the upper disk and to clamp the entire assembly together. It is to be noted that clamping member 72 has a T-shaped cross section, with a clearance between the inwardly-directed portion of clamping member 72 and the enlarged upper end of the aluminum sleeve 50, in order to insure full clamping pressure being applied to the disks and their spacers.

Central fixed aluminum shaft 44 is fixedly mounted to the housing 22 by any suitable arrangement, which, as shown in FIG. 3, may include the threaded fastener 76. The upper and lower bearing assemblies 60 permit the easy rotation of the rotor portion of motor 28 and hard disks 36 relative to the inner fixed stator portion of the motor, including the central shaft 44 and motor coils 30. And, although the attachment between aluminum disk-mounting sleeve 50 and upper and lower bearing assemblies 60, respectively, is shown to be by means of the bonding method illustrated and discussed above, the bearings are normally designed to operate with a certain level of pre-loading such that, in some applications, it may be more desirable to omit the bonding construction and install bearing assemblies 60 into aluminum disk-mounting sleeve 50 by means of a press or interference fit at either end.

The system of the present invention has a storage capacity of up to approximately 382 megabytes (unformated) or up to 344 megabytes (typical format) as compared with approximately 170 megabytes for prior similar hard disk drives of the type mentioned above having only 5 hard disks. Further, the increased storage capacity is accomplished within the industry standard dimensions and temperature ranges as set forth hereinabove.

In conclusion, it is to be understood that the foregoing detailed description relates to an illustrative preferred embodiment of the invention. Various alternative constructions for implementing the invention could include, for example, the use of a shrink fit or separate clamping members at both the top and bottom of the aluminum mounting sleeve assembly, or the use of an additional concentric aluminum sleeve spaced with a slight clearance from the mounting sleeve, to which the hard disks and spacers are firmly secured, to form a unitary disk assembly, which could then be mounted as a unit to the mounting sleeve 50 as shown in the drawings. It is also to be noted that the rotor member could be of another magnetic material other than steel, and the disks may be of an alloy or other material other than aluminum. Accordingly, the present invention is not limited to the precise embodiment shown in the drawings and described in detail hereinabove.

We claim:

1. A high capacity hard disk information storage system, comprising:
    a cylindrical disk memory asembly of rigid material comprising an inner cylindrical sleeve part having an inner diameter and a plurality of axially-spaced, disk-shaped planar storage members extending radially outward therefrom, each of said storage members having at least one surface extending perpendicular to the axis of said cylindrical assembly and being coated on said surface with a magnetizable material for recording magnetic information thereon;
    magnetic head means, movable relative to said coated surfaces and between said members, for reading and writing said magnetic information on said members;
    a fixed central shaft;
    an electric motor disposed coaxially within said cylindrical memory assembly, said motor having a stator mounted on said fixed central shaft;
    bearing means mounted on said fixed shaft above and below said stator for mounting said disk assembly for rotational movement about said shaft and relative to said magnetic head means;
    said motor further including a rotor, including an outer cylindrical member of magnetic material, said cylindrical member having an outer diameter sized less than said cylindrical sleeve inner diameter in an amount sufficient to prevent substantial interference between said member and said sleeve during thermal expansion or contraction thereof over a given temperature range; and
    means for resiliently mounting said cylindrical motor rotor member to said sleeve with said motor rotor in operative proximity to said stator.

2. A system as defined in claim 1 wherein said resilient mounting means is a resilient flexible adhesive.

3. The system as defined in claim 2, wherein:
    said cylindrical member is chamfered at either end to provide a pair of circular, adhesive-receiving spaces between said member's outer diameter and said sleeve's inner diameter; and
    said adhesive material substantially fills each said adhesive-receiving space to form a bead of said adhesive material attaching said sleeve to said member at both ends of said sleeve.

4. The system as defined in claim 2, wherein said adhesive material further comprises:
    a one-component, RTV-type, cured-in-place silicone rubber.

5. A system as defined in claim 2, wherein said outer and inner diameters of said member and said sleeve, respectively, are sized to provide a radial clearance of about 0.002–0.003" at room temperature.

6. The system as defined in claim 1, wherein said outer and inner diameters of said member and said sleeve, respectively, are sized to provide a radial clearance of about 0.002–0.003" at room temperature.

7. The system as defined in claim 1, wherein said motor is a brushless DC motor and wherein said motor rotor includes permanent magnet means mounted to and within said cylindrical member.

8. A high-capacity hard disk information storage system, comprising:
    a plurality of rigid, annular-shaped, magnetizable information storage disks stacked in tandem, spaced relationship;
    magnetic head means for interleavingly-reading and writing information magnetically upon said disks;
    a motor disposed coaxially within said disks, said motor having a fixed stator and a cylindrical member of magnetized material forming a part of a rotor rotatable relative to said stator;
    an aluminum disk mounting sleeve disposed coaxially about said motor, said sleeve having a length substantially co-extensive with said motor;
    bearing means for mounting said disk mounting sleeve to said stator for relative rotation thereabout;
    disk mounting means for mounting said storage disks between an upper end and a lower end of said aluminum mounting sleeve, with said storage disks being aligned with, and spaced from, one another; and
    bonding means for resiliently-attaching said sleeve to said cylindrical member such that no difference in thermal expansion or contraction between said sleeve and said member over a given temperature range results in detachment of said parts from each other or substantial distortion of said sleeve.

9. The system as defined in claim 8 wherein said disk mounting means further comprises:
    a flange at one end of said disk mounting sleeve; and
    clamping means at the other end of said sleeve to clamp said aluminum storage disks against said flange.

10. The system as defined in claim 8, wherein said bonding means further comprises:
    said aluminum mounting sleeve and said steel cylindrical member being sized to provide a radial clearance therebetween for thermal expansion;
    a chamfer at the ends of said cylindrical member defining a pair of circular, adhesive-receiving spaces between said sleeve and said member; and
    a bead of resilient adhesive material substantially filling each said adhesive-receiving space and attaching said sleeve to said cylindrical member.

11. The system as defined in claim 10, wherein said radial clearance is about 0.002–0.003".

12. The system as defined in claim 10, wherein said adhesive material further comprises:
    a one-component, RTV-type, cured-in-place silicone rubber.

13. The system as defined in claim 8, wherein said disks substantially enclose said motor from one end of said motor to the other end thereof.

14. The system as defined in claim 8, wherein said motor is a brushless DC motor and wherein said motor rotor includes permanent magnet means mounted to and within said cylindrical steel member.

* * * * *